US005424129A

United States Patent [19]

Lewis et al.

[11] Patent Number: 5,424,129

[45] Date of Patent: Jun. 13, 1995

[54] COMPOSITE METAL OXIDE PARTICLE PROCESSES AND TONERS THEREOF

[75] Inventors: Richard B. Lewis, Williamson; Michael J. Levy, Webster, both of N.Y.

[73] Assignee: Xerox Corporation, Stamford, Conn.

[21] Appl. No.: 976,597

[22] Filed: Nov. 16, 1992

[51] Int. Cl.[6] .......... B32B 5/00

[52] U.S. Cl. .......... 428/403; 428/404; 428/405; 428/421; 428/447; 428/699; 428/701; 430/110

[58] Field of Search .......... 428/403, 404, 405, 402, 428/421, 447, 699, 701, 702, 689; 430/110

[56] References Cited

U.S. PATENT DOCUMENTS

| | | | |
|---|---|---|---|
| 3,720,617 | 3/1973 | Chatterji et al. | 252/62.1 |
| 4,113,658 | 9/1978 | Geus | 252/454 |
| 4,600,646 | 7/1986 | Stout | 428/405 |
| 4,665,013 | 5/1987 | Sack et al. | 430/532 |
| 4,824,754 | 4/1989 | Mikami | 430/110 |
| 4,880,703 | 11/1989 | Sakamoto et al. | 428/378 |
| 5,100,770 | 3/1992 | Ashida | 430/523 |
| 5,145,719 | 9/1992 | Towata et al. | 427/215 |
| 5,219,694 | 6/1993 | Anno et al. | 430/106.6 |
| 5,298,328 | 3/1994 | Abe et al. | 428/403 |
| 5,332,639 | 7/1994 | Nakamura et al. | 430/110 |

FOREIGN PATENT DOCUMENTS 60-93455 5/1985 Japan .

*Primary Examiner*—Patrick J. Ryan

*Assistant Examiner*—Marie R. Macholl

*Attorney, Agent, or Firm*—John L. Haack

[57] ABSTRACT

A composite metal oxide charge enhancing additive composition comprised of a first metal oxide forming a core particle, and a second metal oxide forming an outer layer on the first metal oxide core particle of the formula $[(M^1O_n)x]-[(M^2O_n)_y]$ wherein $M^1$ represents the first metal oxide metal, $M^2$ represents the second metal oxide metal, n is an integer representing the number of oxygen atoms and is determined by the valence of the metal M to which the oxygen atoms are bonded, x and y represent the relative molar ratios of the first and second metal oxides, and wherein $M^1$ is different from $M^2$.

Another embodiment is a composite metal oxide toner charge enhancing additive composition comprising an organosilane outer layer or coating covalently bonded on the outer surface of the second metal oxide layer of the formula $\{(M^1O_n)_x\}-\{M^2O_n)_y\}-\{Si\ R_{4-n})_z\}$ wherein $(Si\ R_{4-n})_z$ represents the covalently bonded organosilane outer layer surface coating where Si is the silicon atom of the organosilane linking or coupling agent; R is a member of the group of alkyl, alkenyl, alkynyl, aryl, alkaryl, aralkyl having between 1 to 25 carbon atoms or halogenated and oxygenated derivatives thereof; m is an integer with a value of at least one; n of the organosilane is an integer having a value of 1 to 3 and z is determined from the molar ratio of the silane component relative to the first and second metal oxides.

8 Claims, 1 Drawing Sheet

COMPOSITE METAL OXIDE PARTICLE PROCESSES AND TONERS THEREOF

BACKGROUND OF THE INVENTION

This invention is generally directed to toner and developer compositions, and more specifically, the present invention relates to negatively charged toners containing composite metal oxides. In process embodiments, the composite metal oxides selected are prepared by treating submicron metal oxide powders, like tin oxide, with a metal halide or a reactive main group element containing reagent, with water vapor, and then optionally with a coupling component, like a fluorinated silane. More specifically composite metal oxides that assist in enabling a negatively charged toner can be prepared by treating, for example, tin oxide particles with silicon tetrachloride, followed by contacting the resulting product with water vapor, and thereafter reacting the product obtained with a fluorinated silane coupling agent. Normally, metal oxides, such as many of the prior art tin oxides when incorporated into toners, provide or assist in providing a positive or weakly negative charge to the toner. In contrast, the composite metal oxides prepared by processes of the present invention when selected for toners provide or assist in providing a pronounced negative charge to the toner of, for example, −10 microcoloumbs per gram to −40 microcoloumbs per gram. Also, toners with the composite metal oxides prepared in accordance with the processes of the present invention possess rapid admix characteristics, such as from between about 15 seconds to about 3 minutes.

The composite metal oxide particles and toner compositions in embodiments of this invention may generally be prepared as described herein, and such processes comprise further aspects of the present invention. In an embodiment of the present invention, the toner compositions are comprised of resin particles, pigment particles, and as a charge and performance enhancing additive composite metal oxide or oxides obtained with the processes of the present invention. One embodiment of the present invention relates to toner compositions comprised of a polymer resin or polyblend mixture, reference U.S. Pat. No. 4,556,624, the disclosure of which is totally incorporated herein by reference, of a first crosslinked polymer, a second polymer, pigment such as carbon black, a wax component, and a metal oxide, such as tin oxide charge enhancing additive obtained with the processes of the present invention, and optional surface additives such as silicas, metal salts, metal salts of fatty acids, or mixtures thereof. The developer compositions of the present invention are comprised of the toners illustrated herein and carrier particles. The carrier particles in embodiments of the present invention are comprised of a core free of a coating or with a polymeric coating, including, for example, a coating thereover generated from a mixture of polymers that are not in close proximity thereto in the triboelectric series, reference U.S. Pat. Nos. 4,935,326 and 4,937,166, the disclosures of which are totally incorporated herein by reference. Developer compositions comprised of the aforementioned toner and carrier particles are useful in electrostatographic or electrophotographic imaging and printing systems, especially xerographic imaging processes, including high speed processes, that is those generating from about 75 to about 125 copies per minute. Additionally, in embodiments, developer compositions comprised of the toners of the present invention and carrier particles of the aforementioned issued U.S. Patent are useful in imaging methods wherein relatively constant conductivity parameters are desired. Furthermore, in the aforementioned imaging processes the triboelectric charge on the carrier particles can be preselected depending, for example, on the polymer composition applied to the carrier core.

Advantages associated with the toners and developers of the present invention in embodiments thereof include desirable toner triboelectric charging characteristics, excellent toner flow properties, excellent toner admix characteristics, excellent color developer formulations for process color and transparency applications, stable performance for extended time periods exceeding, for example, 500,000 imaging test cycles in a xerographic imaging test fixture including those as illustrated in U.S. Pat. Nos. 4,394,429 and 4,368,970, the disclosures of which are totally incorporated herein by reference, the capability to vary the triboelectric charge on the carrier independent of the conductivity thereof; varying the conductivity on the carrier independent of the triboelectric charge thereof; use of the developer in imaging processes wherein a release fluid such as silicone oil is present; use of the developer in imaging processes wherein a minimum amount, or no release fluid, such as silicone oil is present; selection of the developer for electrophotographic, especially xerographic, heated fuser and pressure systems wherein the fuser roll coating is a silicone, reference for example the commercially available Xerox Corporation 1075® and 1090® imaging apparatuses; and the like.

Other advantages include providing a convenient and economic process for making composite metal oxide particles; toners and developers thereof; enhanced toner flow; enhanced toner transfer efficiency; and colorless particles for use in multicolor xerography.

Toners with charge additives, including those that impart a positive charge, or negative charge to the toner are known generally. Toner compositions with crosslinked resins and second resins, together with waxes and charge enhancing additives are disclosed, for example, in U.S. Pat. No. 4,556,624, the disclosure of which is totally incorporated herein by reference, and some of the prior art references mentioned thereon, and cited against this patent. More specifically for enhancing the positive charging characteristics of toner compositions there can be incorporated in the toner charge enhancing additives, inclusive of alkyl pyridinium halides, reference U.S. Pat. No. 4,298,672, the disclosure of which is totally incorporated herein by reference, organic sulfate or sulfonate compositions, reference U.S. Pat. No. 4,338,390, the disclosure of which is totally incorporated herein by reference; distearyl dimethyl ammonium sulfate, reference U.S. Pat. Nos. 4,560,635 and 4,937,157, the disclosures of which are totally incorporated herein by reference; and other similar known charge enhancing additives including other quaternary ammonium salts. These additives are usually incorporated into the toner in an amount of from about 0.1 percent by weight to about 10, and preferably in an amount of from about 0.1 to about 5, and more preferably from about 0.3 to about 1.0 percent by weight. The triboelectric charge of the toner as determined, for example, by the known Faraday Cage process, or a charge spectrograph is from about 10 to about 40, and preferably from about 15 to about 25 microcoulombs per gram. Toners with negative charge additives, such as aluminum complexes, reference U.S. Pat. No. 4,845,003 are also known. Moreover, other toner formulations containing metal oxides, such as tin oxides generally function as a positive charge additive as is demonstrated in a comparative example.

In a patentability search there were noted the following patents, the disclosures of which are incorporated by reference in their entirety:

Mikami, in U.S. Pat. No. 4,824,754 issued Apr. 25, 1989, discloses a toner particle composition having an inorganic material in or on the toner particle surface. The inorganic material is in the form of particles that have been treated with a titanate coupling agent on the inorganic material surface. The inorganic material is for example a metallic oxide, a carbonate or a silicate.

Kubo et al., in Japanese publication Kokai No.:60[1985]-93,455, published May 25, 1985, disclose developers for electrophotography containing minute particles, for example, colloidal silicon dioxide, treated with a fluorine-substituted silane coupling agent. The toner compositions containing the treated particles afford the following advantages: no fogging of images, extended service life, less dependence on environmental conditions, and excellent fluidity. The treated particles are obtained by spray drying a solution of a silane coupling onto the surface of the metal oxide particles and thereafter the treated particles are admixed with a toner particle composition.

Chatterji et al., in U.S. Pat. No. 3,720,617, issued Mar. 13, 1973, disclose a developer material comprised of colored toner particles having a minor portion of submicroscopic silicon dioxide surface additive particles wherein at least a portion of the silicon atoms on the outside surface of the silicon dioxide particles are attached through an oxygen atom to another silicon atom bearing between one to three carbon atoms.

Geus in U.S. Pat. No. 4,113,658 issued Sep. 12, 1978, discloses a process for depositing by precipitation from aqueous solution a metal or metal compound on the surfaces of support particles resulting in catalytic and magnetic materials, for example, iron oxide dispersed on silica or a mixed cobalt-nickel alloy on silica. The deposited metal or metal compound is obtained in the form of a thin layer or in the form of discrete particles, and, in either form is substantially homogenously distributed over the surface, and is further either crystallographically or electrostatically adhered to the support.

A disadvantage in many prior art methods for preparing metal oxide particulate charge and flow additives is that they do not permit separate adjustment of particle bulk conductivity and particle surface composition. For example, for rapid admix properties high bulk conductivity is preferred, as, for example, as disclosed in U.S. Pat. No. 4,426,436 and for adjusting triboelectric properties, surface modification is usual. Further, prior art methods using solution coating methods using solvents often cause irreversible agglomeration of submicron oxide particles thereby destroying the submicron particle dispersibility and flow-improving capacity on toner surfaces. For example, water slurrys of tin oxide powders dry to permanently or non-friable caked solids.

Thus, there remains a need for black or colored toners wherein toner flow and negative charging properties may be readily attained by the addition of metal oxide composite particles and surface treated metal oxide particles of the insetant invention. Furthermore, there is a need for a composite particle formation process wherein the synthetic yields are high, such as from about 70 percent to nearly quantitative and without resorting to excessive isolation and purification procedures. In addition to the above, there is also a need for black and colored toners that are of excellent image resolution, non-smearing and of excellent triboelectric charging characteristics. In addition, there is a need for black or colored toners with low fusing temperatures, of from about 110 degrees centigrade to about 150 degrees centigrade as determined by known minimum fix temperature techniques and glass transition temperature measurements, of high gloss properties such as from about 50 gloss units to about 85 gloss units as measured by a VWR 75° gloss meter, of high projection efficiency, such as from about 75 percent efficiency to about 95 percent efficiency or more, and, in addition, result in minimal or no paper curl.

SUMMARY OF THE INVENTION

It is an object of the present invention to provide toner and developer compositions.

In another object of the present invention there are provided negatively charged toners with many of the advantages illustrated herein including excellent flow characteristics, especially for dispensed toner; desirable admix of, for example, from 15 seconds to about 1 minute in embodiments; stable toner tribocharging; resistance to a relative humidity of from about 10 to about 90 percent; and the like.

Additionally, in another object of the present invention, there are provided negatively charged toners containing composite metal oxide particles prepared by the treatment of a core metal oxide particle sequentially with a silicon tetrahalide reactant and a fluorinated silane coupling agent.

Another object of the present invention resides in the provision of developers with a toner comprised of the components of U.S. Pat. No. 4,556,624, the disclosure of which is totally incorporated herein by reference, with the composite metal oxides and surface treated metal oxides obtained with the processes illustrated herein as surface additives thereon affording negatively charging toners.

In yet a further object of the present invention, there are provided economic processes for the preparation of composite metal oxide particles of the formula $[(M^1O_n)_x]-[(M^2O_n)_y]$ and surface treated composite metal oxide particles of the formula $[(M^1O_n)_x]-[(M^2O_n)_y]-[(Si\ R_{4-n})_z]$, and toner and developer compositions thereof.

In another object, the present invention is directed to processes for the preparation of toner compositions comprised of a copolymer resin, a pigment, charge control or enhancing composite particles and optionally surface additives and imaging processes thereof.

These and other objects of the present invention can be accomplished in embodiments thereof by providing toner compositions comprised of pigment particles, resin or resin particles, and a first metal oxide forming a core particle, and a second metal oxide forming an outer layer on metal oxide core particle of the formula $[(M^1O_n)_x]-[(M^2O_n)_y]$ wherein $M^1$ represents the first metal oxide metal, $M^2$ represents the second metal oxide metal, n is an integer of from 1 to 5 representing the number of oxygen atoms and is determined by the valence of the metal M to which the oxygen atoms are bonded, x and y represent the relative molar ratios of the first and second metal oxides, and wherein $M^1$ is different from $M^2$ and optionally an organosilane outer layer or coating on the outer surface of the second metal oxide layer of the formula $[(M^1O_n)_x]$-$[(M^2O_n)_y]$-$[(Si\ R_{4-n})_z]$ wherein $[(Si\ R_{4-n})_z]$ represents the bonded organosilane outer layer surface coating where Si is the silicon atom of the organosilane derived linking or coupling agent $[(Si(X)_n\ R_{4-n})_z]$; where X is a leaving or departing group and is selected from the group consisting of alkoxy, alkenyloxy, alkynyloxy, alkaryloxy, aryloxy, and halo; R is with 1 to about 25 carbon atoms and alkyl, alkenyl, alkynyl, aryl, alkaryl, aralkyl and halogenated derivatives thereof; n of the organosilane is an integer having a value of 1 to 3 and z is determined from the molar ratio of the silane component relative to the first and second metal oxides and wherein the other component such as $M^1$ are as indicated herein.

Preferred xerographic toners compositions are formulated with conventional toner particles comprised of polymeric resins and pigments and toner charge enhancing additive composite particles comprised of metal oxide core particles having a second metal oxide surface layer and optionally a surface coupled layer comprised of, for example, an organosilane as an outermost coating on the surface of the second metal oxide layer. Toner formulations containing the charge enhancing additive composite particles provide optimum combinations of the aforementioned properties and afford an effective means by which to control the charging and flow properties. The ability to control charging and flow characteristics of toner formulations is important for achieving high quality xerographic images and, in particular, for pictorial color applications.

In embodiments, the process of the present invention comprises preparing charge enhancing additive composite particles comprising providing a metal oxide core particle, or alternatively, obtaining a core metal oxide particle by way of vapor phase flame hydrolysis of a first metal halide, $M^1X_n$ to form metal oxide core particles of the formula $[(M^1O_n)_x]$; isolating the metal oxide core particles; exposing the core metal oxide particles to vapor comprising a second dissimilar metal halide, $M^2X_n$, and exposing the product to water vapor to form composite metal oxide particles of the formula $[(M^1O_n)_x][(M^2O_n)_y]$ wherein the $(M^2O_n)_y$ metal oxide is chemically bound to the surface of the core metal oxide particles $(M^1O_n)_x$ wherein $M^1$ is a metal, $M^2$ is a metal different from $M^1$, n is an integer determined by the valence of the metal (M) to which the oxygen atoms are bonded, and x and y indicate the relative molar amounts of the metal oxides in each phase of the composite particle. The $[(M^1O_n)_x]$ particles serve as core particles and the second metal oxide formed $(M^2O_n)_y$ serves as a thin covalently bonded surface coating or layer of dissimilar metal oxide on the core particles. The composite metal oxide particles may be optionally surface treated with known reactive metal oxide surface coupling agents, for example, $[(Si(X)_nR_{4-n})_z]$ to form composite particles having a formula $[(M^1O_n)_x][(M^2O_n)_y][(Si\ R_{4-n})_z]$.

In an alternative preparative process embodiment, the aforementioned reaction product of the metal oxide core particle and the metal halide may be reacted directly with a suitably reactive coupling agent to form the desired silane surface treated composite metal oxide particles. In this way, additional isolation and hydrolysis steps may be circumvented.

The charge enhancing additive composite particles may be formulated into toner compositions either by melt admixing with resin and pigment or preferably the charge enhancing additive particles of the instant invention may be admixed onto the surface of preformed toner particles obtained through conventional means, for example, by comminution and jetting classification or toner particles formed by in situ methods. Similarly, developer compositions are known that are useful for imaging with toner compositions of the instant invention. These, and other objects of the present invention can be accomplished in various embodiments of the present invention by providing toner and developer compositions. The toner in an embodiment is comprised of a resin, pigment particles, a metal oxide charge enhancing additive, which charge additive is obtained with the processes as illustrated herein. Carrier particles admixed with the toner to form a developer are comprised of a core of, for example, steel, iron powder, iron, ferrites, other known cores, and the like, which core may contain a polymer thereover at typical coating weights of, for example, from about 0.05 to about 3 weight percent, such as methyl terpolymers, and the like. Also, there may be selected as carriers, particles comprised of a core with a coating thereover comprised of a mixture of polymers. More specifically, the carrier particles selected can be prepared by mixing low density porous magnetic, or magnetically attractable metal core carrier particles with from, for example, between about 0.05 percent and about 3 percent by weight, based on the weight of the coated carrier particles, of a mixture of polymers until adherence thereof to the carrier core by mechanical impaction or electrostatic attraction; heating the mixture of carrier core particles and polymers to a temperature, for example, of between from about 200° F. to about 550° F. for a period of from about 10 minutes to about 60 minutes enabling the polymers to melt and fuse to the carrier core particles; cooling the coated carrier particles; and thereafter classifying the obtained carrier particles to a desired particle size.

DETAILED DESCRIPTION OF THE INVENTION

The composite metal oxide charge additives of the present invention can be prepared in embodiments by the treatment of known metal oxides as purchased commercially with, for example, silicon tetrahalide, followed by exposing the resulting product to water vapor, to form a composite metal oxide particle of the formula $[(M^1O_n)_x]$-$[(M^2O_n)_y]$ having a core metal oxide and a substantially monomolecular surface metal oxide layer which core and surface metal oxides are derived from dissimilar metals and optionally subsequently subjecting the aforementioned resulting material to reaction with a coupling agent, for example, a halogenated silane coupling agent to provide a surface treated metal oxide composite particle of the formula $[(M^1O_n)_x]$-$[(M^2O_n)_y]$-$[(Si\ R_{4-n})_z]$.

Figure 1:
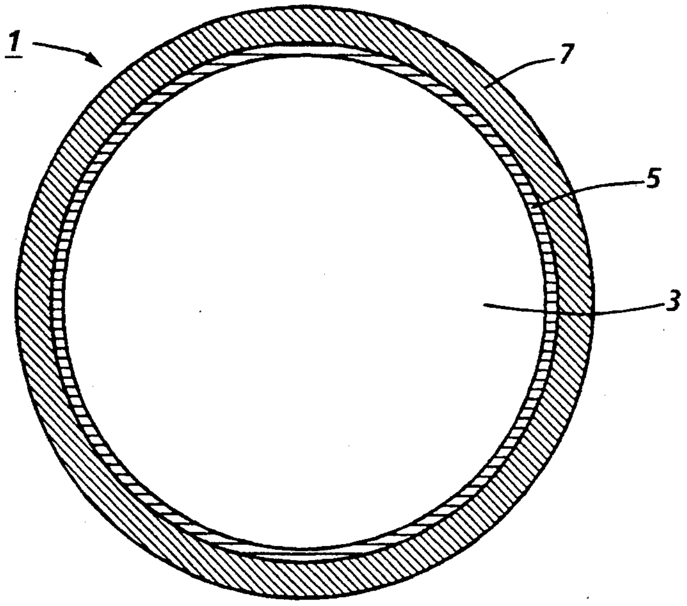
FIG. 1 is an example schematic representation of a surface treated composite metal oxide particle of the instant invention.

Referring to FIG. 1, a schematic cross section of the surface treated composite metal oxide particle 1 illustrates the aforementioned metal oxide core particle 3 of the form $[(M^1O_n)_x]$ surrounded, encapsulated or covalently coated with a second metal oxide layer 5 of the form $[(M^2O_n)_y]$ which is further optionally surrounded, encapsulated or covalently coated with a coupling agent of the form $[(Si(X)_nR_{4-n})_z]$ to create an outer surface layer 7. The composite particles of the instant invention may be spherical or irregular in shape and which shape may be controlled in part by the reaction conditions selected. The surface of the composite particles may be smooth or rough also depending in part upon the conditions selected for the reactions.

Figure 2:
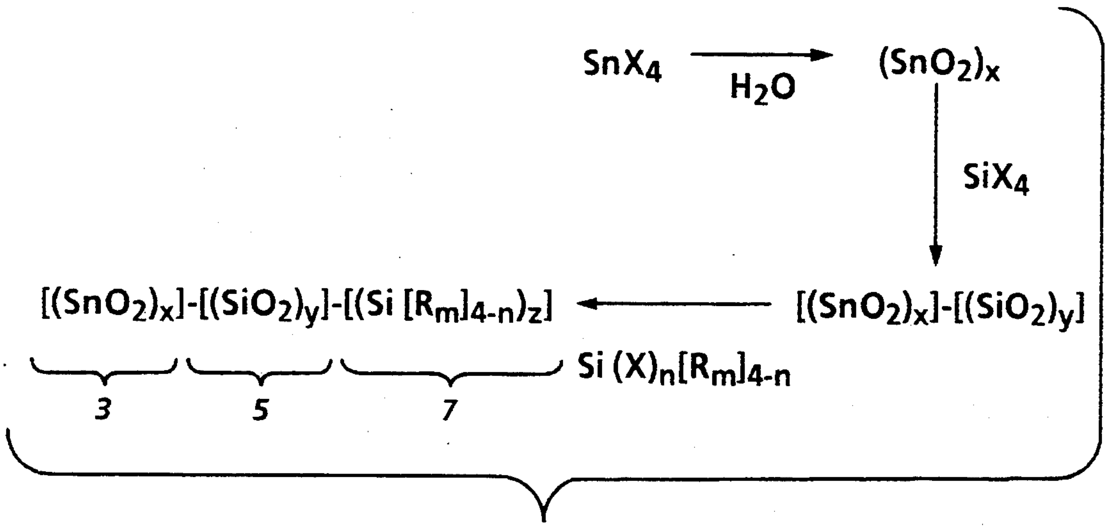
FIG. 2 is an example reaction sequence used to prepare an example of the composite particles and surface treated composite particles of the instant invention.

FIG. 2 illustrates an example reaction sequence used in embodiments for the preparation of composite metal oxide particles and surface treated metal oxide composite particles of the instant invention. As an example, a suitable tin halide compound, $SnX_4$ is converted under flame hydrolysis conditions to submicron, 0.1 to 1 micron, for example, tin oxide particles, $[(SnO_2)_x]$, which are subsequently reacted with a silicon halide, $SiX_4$, and the product is then exposed to water vapor to form composite metal oxide particles, $[(SnO_2)_x]$-$[(SiO_2)_y]$, referred to herein as tin oxide core-silicon dioxide surface composite particles. The use of bracketed notation indicates that a discrete and distinct layer or phase is present rather than random or mixed phases. In the situation of the core coating metal oxide layer and coupling agent layer, the layers may be quite thin, for example, several Angstroms to several hundred Angstroms, and preferably monomolecular, that is a monolayer. The product may then, optionally, be surface treated either directly or after hydrolysis and isolation of the composite metal oxide particles $[(SnO_2)_x]$-$[(SiO_2)_y]$, with, for example, known organosilane coupling agents, by conventional means to form a surface treated composite metal oxide particle composition having the form $[(SnO_2)_x]$-$[(SiO_2)_y]$-$[(Si\ R_{4-n})_z]$. The term "composite metal oxide particle" as used herein refers in embodiments to the formula $[(M^1O_n)_x]$-$[(M^2O_n)_y]$ and the term "surface treated composite metal oxide particle" refers to the formula $[(M^1O_n)_x]$-$[(M^2O_n)_y]$-$[(Si\ R_{4-n})_z]$ wherein $M^1$ represents a first metal oxide which serves as a core particle, $M^2$ represents a second metal oxide which is preferably vapor deposited, or achieved by other chemically equivalent procedures, and is covalently bound to the substantially outer surface of the first metal oxide core particles, n in the metal oxides is an integer of 1 to 5 and is determined by the valence of the metal M to which the oxygen atoms are bonded, and x and y represent the relative molar ratios of the core and surface layer first and second metal oxides. The $[(Si\ R_{4-n})_z]$ represents the bonded organosilane outer layer surface coating where Si is the silicon atom of the organosilane linking or coupling agent; R is not a leaving or departing group and is a member of the group having between one and twenty-five carbon atoms selected from alkyl, alkenyl, alkynyl, aryl, alkaryl, aralkyl and the like or halogenated derivatives thereof; n in the bonded silane portion or layer is an integer of 1 to 3 and is determined by the silane coupling agent selected, and z is determined from the molar ratio of the silane component relative to said first and second metal oxides. More specifically the composite metal oxide forming process of the present invention comprises vapor phase treatment of particulate submicron metal oxides, like tin oxide with an average particle diameter of from between about 0.0050 to about 0.05 micrometers, with silicon tetrachloride, subjecting the resulting treated product to water vapor, and, optionally, subsequently contacting the resulting isolated material with a coupling agent, for example, a fluorinated silane coupling agent.

The particle size of the metal oxide core particles $[(M^1O_n)_x]$ selected to prepare the charge enhancing additive particles is from about 0.0050 to about 0.05 micrometers diameter, the thickness of each metal oxide surface layer $[(M^2O_n)_y]$ is from about 1 to about 5 molecular layers, and the thickness of the organosilane outer layer $[(Si\ R_{4-n})_z]$ is from about 1 to about 5 molecular layers, preferably a monolayer.

Examples of metal oxide core particles of the formula $[(M^1O_n)_x]$ may be selected from the group consisting of $SnO_2$, $TiO_2$, $SiO_2$, $Al_2O_3$ and CeO.

Examples of metal oxide core surface coating metal oxides of the formula $[(M^2O_n)_y]$ may be selected from the group consisting of tin oxide, silicon oxide, titanium oxide and aluminum oxide with the proviso that $M^1$ is dissimilar to $M^2$.

Many coupling agents useful in forming the outermost surface layer are known. They include but are not limited to: $CF_3(CF_2)_6CH_2O(CH_2)_3Si(OC_2H_5)_3$; $(CF_3)_2CFO(CH_2)Si(OCH_3)_3$; $CH_3Si(OCH_3)_3$; $C_2H_5Si(OC_2H_5)_3$; $CH_2{=}CHSi(OC_2H_5)_3$; $CH_2{=}CHSi(OCH_3)_3$; $CH_2{=}C(CH_3)COO(CH_2)_3Si(OCH_3)_3$; $H_2NCH_2CH_2NH(CH_2)_3Si(OCH_3)_3$; $CH_3C_6H_4Si(OCH_3)_3$; $H_2N(CH_2)_3Si(OC_2H_5)_3$; $BrCH_2C_6H_4Si(OCH_3)_3$; epoxy O—$CH_2$—CH—$CH_2O(CH_2)_3Si(OCH_3)_3$; $C_6H_5Si(OCH_3)_3$; $Cl(CH_2)_3Si(OCH_3)_3$; $HS(CH_2)_3Si(OCH)_3$; p—$ClC_6H_4CH_2Si(OCH_3)_3$; $BrC_6H_4Si(OCH_3)_3$; disilazanes; and disilanes, and the like, as disclosed in *Silane Coupling Agents,* by Edwin P. Plueddemann, 2nd Ed., Plenum Press, 1991, ISBN 0-306-43473-3, the disclosure of which is incorporated herein in its entirety. A number of other preferred organosilane coupling or linking agents are disclosed in *Silicon Compounds, Register and Review,* published by Petrarch Systems, Bristol, Pa. (1982), for example, trialkylsilylchlorides and dialkylsilyldichorides, the disclosures of which is totally incorporated herein by reference.

A preferred class of coupling agents $[(Si(X)_nR_{4-n})_z]$ useful in forming the outermost surface layer $[(Si\ R_{4-n})_z]$ is fluorocarbon substituted silanes of the type trifluoroalkyl alkyl dihalo silane. A particularly preferred fluorinated coupling agent in embodiments of the instant invention is 3,3,3-trifluoropropyl methyl dichlorosilane.

Metal oxide composite particles of the instant invention may have more than one layer of the second metal oxide $(M^2O_n)$. That is, by repeating the steps of hydrolysis and treatment with metal halide $(M^2X_n)$, multiple layers may be built up. Optionally, dissimilar metal halides may be used sequentially and repeatedly to build up a multilayer or onion skin structure of dissimilar metal oxides. In another option, the composite particle product may be further treated with a coupling agent such as a silane or fluorosilane to provide desired hydrophobicity or preferred triboelectric properties.

Metal oxide composite particles prepared by processes of the instant invention may have in the formula $[(M^1O_n)_x]$-$[(M^2O_n)_y]$ relative molar ratios of x to y of about 100:10 to about 100:0.01 depending on the size and surface area of the core particles. That is the metal oxide core particle $[(M^1O_n)_x]$ comprises a majority of the molar composition and weight of the composite particles. Similarly, the surface treated metal oxide composite particles of the instant invention possess in the formula $[(M^1O_n)_x]$-$[(M^2O_n)_y]$-$[(Si\ R_{4-n})_z]$ a relative molar ratio of y:z from about 1:1 to about 1:5 reflecting a range from a monolayer to multiple layers of the second metal oxide as a dissimilar metal oxide layer on the core metal oxide particle and is also indicative of a preponderance of the metal oxide core content in both the composite metal oxide particles and the surface treated metal oxide composite particles.

In surface treatments with the metal halides $M^2X_n$ the molar ratio $M^2X_n/M^1O_n$ is preferably adjusted to form 1 to 3 oxide layers of $M^2$ atom equivalents on the core particle metal oxide surface. In the hydrolysis step, water is preferably supplied in excess of 10 oxide layer equivalents. Between metal oxide surface treatment steps the product is preferably tumbled in flowing argon at 400° C. for at least 15 minutes in order to purge unreacted reagents.

The toner in an embodiment of the present invention is comprised of a resin blend of two polymers, a first crosslinked polymer, a second uncrosslinked polymer, a pigment such as carbon black, or a mixture of pigments of, for example, carbon black and magnetites, a wax component, and present on the toner surface are surface treated composite metal oxide charge enhancing additive particles; and optional performance enhancing additive components. In another embodiment of the present invention, the negatively charged toner is comprised of resin particles, pigment particles, and the composite metal oxide treated charge additive. The triboelectric charge on the toner can vary depending on a number of factors, such as the resin selected, the amount of charge additives used, and the like, generally, however, the tribo charge is from a negative 10 to a negative 45, and preferably from about a negative 10 to about a negative 25 microcoulombs per gram as determined by the known Faraday cage method, or by the charge spectrograph. Admix times of the resulting toner as determined by the charge spectrograph range from about 15 seconds to about 3 minutes, and preferably from about 15 seconds to about 2 minutes.

Illustrative examples of toner polymers useful in toner compositions of the instant invention include, for example, styrene acrylates, styrene methacrylates, styrene butadienes, polyesters, and the like, reference U.S. Pat. No. 4,556,624, the disclosure, and crosslinked polyesters disclosed in co-pending applications U.S. Ser. Nos. 07/814,641 and 07/817,782 (D/91117 and D/91117Q) filed Dec. 30, 1991, the disclosures of which are totally incorporated herein by reference.

Generally, from about 1 part to about 5 parts by weight of toner particles are mixed with 100 parts by weight of the carrier particles to enable the developer. The toner can be subjected to known attrition and classification for the purpose of enabling the toner particles with a known average size diameter of from about 5 to about 25 microns, and preferably from about 9 to about 15 microns.

Numerous well known suitable pigments or dyes can be selected as the colorant for the toner particles including, for example, carbon black, like Regal 330®, channel black, Vulcan black, nigrosine dye, lamp black, and mixtures thereof. The pigment, which is preferably carbon black, should be present in a sufficient amount to render the toner composition highly colored. Thus, the pigment particles are present in amounts of from about 5 percent by weight to about 15 percent by weight, and preferably from about 2 to about 10 weight percent based on the total weight of the toner composition, however, lesser or greater amounts of pigment particles can may be selected.

When the above illustrated pigment particles are mixed with magnetites, which magnetites are known and can be comprised of a mixture of iron oxides ($FeO.-Fe_2O_3$) including those commercially available as Mapico Black, the mixtures are present in the toner composition in for example, an amount of from about 10 percent by weight to about 50 percent by weight, and preferably in an amount of from about 12 percent by weight to about 25 percent by weight. In an embodiment of the present invention, the toner can be comprised of a mixture of magnetite, of from about 12 to about 20 weight percent, and pigment, such as carbon black, in an amount of from about 4 to about 15 weight percent. In another embodiment of the present invention, the toner can be comprised of a mixture of magnetite of from about 25 to about 35 weight percent, and pigment, such as carbon black, in an amount of from about 2 to about 10 weight percent.

Also encompassed within the scope of the present invention are colored toner compositions comprised of a toner blend and as pigments or colorants, red, blue, green, brown, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as Cl 60720, Cl Dispersed Red 15, a diazo dye identified in the Color Index as Cl 26050, Cl Solvent Red 19, and the like. Examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, permanent yellow FGL, and the like. These pigments are generally present in the toner composition in an amount of from about 1 weight percent to about 15 weight percent based on the weight of the toner resin particles.

The toners may contain a wax with, for example, an average molecular weight of from about 500 to about 20,000 and preferably from about 1,000 to about 6,000, examples of which include polyethylenes, polypropylenes, and the like, reference for example British Patent 1,442,835, the disclosure of which is totally incorporated herein by reference, and U.S. Pat. No. 4,556,624, the disclosure of which is totally incorporated herein by reference. Specific waxes include Viscol 660-P, Viscol 550-P available from Sanyo Kasei K. K., Epolene N-15, and the like. Generally, the wax is present in an effective amount of, for example, from about 1 to about 15, and preferably from about 2 to about 10 weight percent. While not being desired to be limited by theory, it is believed that the wax has a number of functions including enabling an increased fusing latitude, 250° F., for example, increased stripping performance, and as a lubricant.

The toner composition may also include other surface additives, in an effective amount of, for example, from about 0.1 to about 5, and preferably from about 0.1 to about 1.5 weight percent, such as silicas, including AEROSIL® R972, metal salts or oxides such as titanium oxide, magnesium oxide, tin oxide, and the like, which metal oxides can assist in enabling negatively charged toners, and metal salts of fatty acids, such as zinc stearate, magnesium stearate, and the like, reference U.S. Pat. Nos. 3,655,374; 3,720,617; 3,900,588 and 3,983,045, the disclosures of which are totally incorporated herein by reference. While not being desired to be limited by theory, it is believed that the surface additives, especially the silicas, enable excellent toner flow characteristics, enhanced and stable triboelectric values, improved stable admix characteristics, and the like.

The toner composition of the present invention can be prepared by a number of known methods including melt blending the toner resin particles and pigment particles, or colorants, wax, and treated metal oxide charge additive, in an extruder followed by mechanical attrition. Other methods include those well known in the art such as spray drying, Banbury melt mixing, and the like. In one extrusion method, a dry blend of the toner components is added to the extruder feeder, followed by heating, to enable a melt mix, which heating in some instances is accomplished at 450° F., and shearing in an extruder, such as the Werner Pfleiderer ZSK 53, cutting the strands of toner exiting from the extruder, and cooling the resulting toner in, for example, water. Thereafter, the toner may be attrited with, for example, an attritor available from Alpine Inc., and classified with, for example, a Donaldson classifier, resulting in toner particles with an average diameter as indicated herein, and in an embodiment of from about 9 to about 20 microns, for example. There can then be added to the resulting toner product surface additives by mixing, for example, in a Lodige Blender the toner and additives, such as composite metal oxide particles with or without a surface or, for example, Aerosil, wherein the surface additives particles may be mechanically impacted on and into the toner surface or alternatively the surface additive particles are dispersed throughout and onto the toner particle surfaces by mild blending wherein the surface additives are not fixed to the surface of the toner particles. The developer compositions can then be prepared by mixing in a Lodige blender the toner with surface additives and carrier particles for effective mixing times of, for example, from about 1 to about 20 minutes.

The toner and developer compositions of the present invention may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phtihalocyanines, metal free phthalocyanines and vanadyl phthalocyanines. As charge transport molecules, there can be selected the aryl diamines disclosed in the '990 patent. Also, there can be selected as photogenerating pigments, squaraine compounds, thiapyrillium materials, titanyl phthalocyanines, especially Type I, Ia, IV, and the like. These layered members may be charged negatively or positively, thus requiring a charged toner of opposite charge. Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference.

Images may be obtained with developer compositions of the instant invention which have acceptable solids, excellent halftones and desirable line resolution with acceptable or substantially no background deposits at, for example, a relative humidity of from about 10 to about 90 percent as determined, for example, by known standard visual and optical copy quality characterization methods.

The following examples are being supplied to further define the present invention, it being noted that these examples are intended to illustrate and not limit the scope of the present invention. Parts and percentages are by weight unless otherwise indicated. A comparative Example is also provided.

EXAMPLE I

Preparation of Surface Treated Composite Metal Oxide Particles of the Formula$[(SnO_2)_x][(SiO_2)_y y][(Si(CH_3)(CH_2CH_2CF_3))_z]$ Tin oxide was made by a flame process according to "Vapor Phase Production of Colloidal Silica", by L. J. White and G. J. Duffy, Industrial and Engineering Chemistry, Vol. 51, Mar. 3, 1959, page 232; "Theory of particle Formation and Growth in Oxide Synthesis Flames", Combustion Science & Technology, Vol. 4, p. 47–57; and "Particle Growth in Flame II, Experimental Results for Silicas Particles", Combustion Science & Technology, G. D. Ulrich et al., Vol. 3, p. 233–239; and as disclosed in U.S. Pat. No. 5,135,832, the disclosures of which are totally incorporated herein by reference, and which process is similar to that used in making fumed silicas such as Aerosil® available from Degussa.

The following procedure illustrates the preparation of a conductive tin oxide powder that was used to assist in rendering the toner composition of the present invention to a specific conductivity level and a specific negative tribocharge.

Nitrogen gas at about 2.0 liters per minute was bubbled through tin tetrachloride (100 grams) at room temperature, about 25° C., and the resulting vapor was mixed with oxygen and hydrogen both flowing at about 0.7 liter per minute with the feed oxygen and hydrogen flow rates maintained at about 0.85 liter per minute. The resulting mixture with approximate molar ratios of tin tetrachloride 1, nitrogen 59, hydrogen 15, and oxygen 15, was then burned into a flame. The combustion products were allowed to agglomerate in flight for about 10 seconds in a glass tube heated to about 200° C., and then collected in a Teflon™ fabric filter by suction. The collected tin oxide product (55.0 grams) was heated in a 500 milliliter rotating flask at 400° C. A stream of air and water vapor was passed into the flask for 30 minutes, followed by a stream of hydrogen gas, argon gas and water vapor for another 30 minutes. The gas flow rate was adjusted to provide more than 10 flask volume exchanges in each of the above treatments. The resulting off-white tin (IV) oxide product (54.0 grams) has an average particle diameter size of about 100 Angstroms as measured by transmission electron microscopy, and a specific resistivity determined by known methods. The freshly prepared product tin oxide particles were cleaned and dried by heating to 400° C., first in a flowing stream of argon and water vapor for 30 minutes and then in a stream of argon for another 30 minutes. The resulting raw tin oxide had a pressed pellet resistivity of about $10^1$ ohm-cm.

A 15 gram sample of raw tin oxide was first treated at 400° C. in a rotating flask through which there flowed a stream of argon at about 0.5 cubic feet per hour containing silicon tetrachloride ($SiCl_4$). The silicon tetrachloride was introduced into the flask by vaporizing about 2 ml into the argon stream over about 3 minutes. The flask was then purged with argon for 15 minutes. Water vapor was then introduced for 30 minutes and the flask purged with argon for 15 minutes and cooled to room temperature. The dry, free flowing intermediate product was stored indefinitely under dry argon until used further.

In a separate flask about 4 grams of the intermediate product were slurried with about 50 ml of dry cyclohexane. To this was added about 0.25 ml of 3,3,3-trifluoropropyl methyl dichlorosilane $SiCl_2(CH_3)(CH_2CH_2CF_3)$, and the resulting suspension was stirred at room temperature for one hour. Cyclohexane solvent was removed by evaporation to recover about 3.8 grams of final product surface treated tin oxide silicon oxide composite particles with a pellet resistivity was about $10^3$ ohm-cm. The silane surface treated metal oxide composite product was a free flowing powder and transmission electron microscopy showed particle size of 100 Angstroms and shape approximately spherical to be indistinguishable from the raw tin oxide. There was no evidence of agglomeration beyond what was observed for the raw tin oxide.

The aforementioned silane treated tin oxide silicon oxide composite of this Example was blended at 1.6 percent by weight on a toner comprised of 10 percent of REGAL 330® carbon black, and 90 percent of styrene butadiene (89/11) weight ratio copolymer by ball-milling for 30 minutes with one-quarter inch steel balls. The resulting toner was mixed at 2 percent weight with a 100 micrometer iron carrier coated with 50/50 Kynar/poly(methyl methacrylate) to prepare a developer. After 60 minutes of roll mill mixing, the developer blow off tribocharge was −39 microcoulombs per gram as determined by the known Farraday Cage method.

COMPARATIVE EXAMPLE II

A developer composition was prepared by repeating the process of Example I with the exception that untreated tin oxide particles instead of surface treated tin oxide particles were used in the toner composition. Blow-off tribocharge was +12 microcoulombs per gram. Thus, the product of Example I produced a large negative shift in tribo charging (−39) relative to untreated raw tin oxide, +12.

COMPARATIVE EXAMPLE III

A toner comprised of 90 percent of a copolymer of styrene n-butyl methacrylate (about 57/43 weight ratio) and 10 percent REGAL 330® carbon black and without a surface additive was ball milled for 30 minutes with one-quarter inch steel balls. The resulting toner was mixed at 2% weight with a ferrite carrier solvent coated with a terpolymer of methyl methacrylate, styrene and vinyl triethoxy silane (about 80/14/6 by weight). After roll mill mixing for 60 minutes, the developer blow off tribo charge as determined by the known charge spectrograph method, was −6 microcoulombs per gram. Admix time was 15 to 30 minutes. The influence of various tin oxide surface additives of the instant invention on triboelectric charge level is summarized in Table 1 below for Examples III (control), IV, V, and VI.

EXAMPLE IV

The processes of Example III were repeated except that untreated tin oxide of Example I was added at 0.8 percent by weight to the toner ball milling step. Blowoff tribo charge was about −12 microcoulombs per gram. Admix time was 20 minutes.

EXAMPLE V

The process of Example III was repeated except that the untreated tin oxide of Example I treated directly with 3,3,3-trifluoropropyl methyl dichlorosilane was used in the composition as an additive. The material was prepared as follows. A 20 g sample of raw tin oxide prepared as in Example I was held at 200° C. in a rotating flask through which flowed argon at about 0.10 cubic feet per hour. Over a period of about 15 minutes, about 1.2 ml of 3,3,3-trifluoropropyl methyl dichlorosilane was introduced into the flask by evaporation into the argon stream from an evaporator held at about 120° C. Finally, the silane surface treated tin oxide product was purged at 200° C. with argon at about 1.0 cubic feet per hour for a period of about 25 minutes. Blowoff tribo charge was −15 microcoulombs per gram. Admix time was about 15 seconds.

EXAMPLE VI

The processes of Example III was repeated except that the final product silane surface treated composite metal oxide of Example I were added at 0.8 percent by weight to the toner ball milling step. Blowoff tribocharge was −26 microcoulombs per gram. Admix time was about 15 seconds. Thus, the final product of Example I produced a large negative shift in tribo charging of the toner composition relative to untreated tin oxide of Example IV.

TABLE 1

Additive Influence on Toner Tribocharge Level

| Example | Additive | Tribocharge (micro C/g)[1] |
|---|---|---|
| III | None | −6 |
| IV | $SnO_2$ | −12 |
| V | $SnO_2$ + silane treatment | −15 |
| VI | final product $[(SnO_2)_x][(SiO_2)_y][(Si(CH_3)(CH_2CH_2CF_3))_z]$ | −26 |

[1]Carrier and toner compositions are the same as indicated in Example III.

EXAMPLE VII

Core metal oxide particles $(M^1O_n)_x$ as defined previously may be reacted with a metal halide $M^2X_n$ as defined previously vapor and the resulting intermediate product subsequently reacted with water vapor and dried. This cycle may then be repeated to build up multiple layers of a dissimilar oxide $[(M^2O_n)_y]$ as defined previously on the surface of the core metal oxide particles. The resultant product may, if desired, be treated in a single reaction or multiple sequential reactions with an organosilane or similar coupling agents to afford particles of the formula $[(M^1O_n)_x][(M^2O_n)_{ya}][(Si\ R_{4-n})_{zb}]$ where subscripts a and b are integers and indicate the number of sequential reactions that are performed in forming the respective layers.

EXAMPLE VIII

The process of Example VII may be repeated with a sequence of aforementioned different metal halides, for example, $M^2X_n$, $M^3X_n$, and $M^4X_n$ to build up a controlled sequence of several dissimilar oxide layers on the surface of the aforementioned core metal oxide particle to afford a product metal oxide composite of the formula $[(M^1O_n)_x][(M^2O_n)_y][(M^3O_n)_z][(M^4O_n)_z]$, where metals $M^1 \neq M^2 \neq M^3 \neq M^4$ and where n, x, y and z are defined above.

EXAMPLE IX

A 15 gram sample of raw tin oxide prepared as in Example I was first treated at 400° C. in a rotating flask through which there flowed a stream of argon at about 1.0 cubic feet per hour containing titanium tetrachloride ($TiCl_4$) introduced into the flask by vaporizing about 4 ml into the argon stream over about 45 minutes. The flask was then purged with argon for 15 minutes. Next, water vapor was introduced for 30 minutes followed by dry argon for 30 minutes to yield an intermediate product.

In a separate flask about 4 grams of the intermediate product were slurried with about 50 ml of dry cyclohexane. To this was added about 0.25 ml of 3,3,3-trifluoropropyl methyl dichlorosilane $SiCl_2(CH_3)(CH_2CH_2CF_3)$, and the resulting suspension stirred at room temperature for one hour. Cyclohexane solvent was removed by evaporation to recover about 3.7 grams of a final product of surface treated tin oxide titanium oxide composite particles.

X-Ray Photoelectron Spectroscopy (XPS) was used to characterize the surfaces of an untreated tin oxide sample of Example I (control), a silicon tetrachloride treated tin oxide powder of Example I, and a titanium tetrachloride treated tin oxide powder of this Example (IX).

The untreated tin oxide control sample was examined using XPS contained tin, oxygen and a small amount of chlorine. Carbon observed in the spectra is believed to arise from double-backed tape used to mount powder samples for analysis and is believed to be an artifact of sample preparation. The amount of carbon detected is believed to be dependent on the amount of tape left exposed and hydrocarbon contamination introduced during sample handling and pumping. Titanium was detected on the surface of the $TiCl_4$ treated tin oxide along with tin, oxygen, chlorine and carbon. Similarly, silicon was detected on the surface of the $SiCl_4$ treated tin oxide.

Quantitative analysis was performed for each sample and the results are tabulated in Table 2.

TABLE 2

XPS ANALYSIS FOR TIN OXIDE POWDERS

| METAL OXIDE SAMPLE | Wt % Sn | Wt % O | Wt % Ti | Wt % Si | Wt % Cl | Wt % C |
|---|---|---|---|---|---|---|
| CONTROL $[SnO_2]_x]$ | 70 | 20 | — | — | 1 | 10 |

TABLE 2-continued

XPS ANALYSIS FOR TIN OXIDE POWDERS

| METAL OXIDE SAMPLE | Wt % Sn | Wt % O | Wt % Ti | Wt % Si | Wt % Cl | Wt % C |
|---|---|---|---|---|---|---|
| $SnO_2$ + $TiCl_4$ | 65 | 24 | 2 | — | <1 | 8 |
| $SnO_2$ + $SiCl_4$ | 68 | 26 | — | 1 | <1 | 5 |

The untreated tin oxide control sample contained about 1 weight percent chlorine. The $TiCl_4$ treated sample contains 2 weight percent titanium, but less than 1 weight percent chlorine. The oxygen content of the $TiCl_4$ and $SiCl_4$ treated samples was higher than for the untreated tin oxide control and is believed to be due to the atomic weight difference of titanium (48) and silicon (28) compared to tin (118) on the surface. The $TiO_2$ coverage also causes the tin concentration of the core tin oxide particle to decrease to about 65 weight percent. Similarly, for the $SiCl_4$ treated tin oxide, the oxygen concentration was higher than for the untreated tin oxide control due to the presence of $SiO_2$ on the core particle surface. Chemical state analysis by XPS confirmed the presence of $TiO_2$ and $SiO_2$ in the respective metal chloride treated samples. $TiCl_4$ and $SiCl_4$ reagents are not stable in moist air and react to form the oxides which products would be expected to have vastly different XPS values compared to those values obtained for the samples presented in Table 2 and as prepared in the instant invention. The XPS results are indicative that titanium and silicon atoms, as their corresponding oxides, have been incorporated into the surface of the tin oxide particles in accordance with the objects of the instant invention.

Other modifications of the present invention may occur to those skilled in the art based upon a reading of the present disclosure and these modifications are intended to be included within the scope of the present invention.

What is claimed is:

1. A composite metal oxide charge enhancing additive composition comprised of a first metal oxide forming a core particle with an average particle size diameter from about 0.005 to about 0.05 microns, and a second metal oxide forming a uniform and continuous outer layer thereover with a thickness of about 1 to about 30 nanometers wherein said first and said second metal oxide are of the formula $\{(M^1O_n)_x\}$-$\{(M^2O_n)_y\}$ wherein $M^1$ represents said first metal oxide metal, $M^2$ represents said second metal oxide metal, n is an integer of 1 to 5 representing the number of oxygen atoms, x and y represent the relative molar ratios of said first and second metal oxides, wherein $M^1$ and $M^2$ are selected from the group consisting of Sn, Ti, Si, Al, and Ce, where $M^1$ is dissimilar to $M^2$, and wherein the relative molar ratio of x to y is selected to provide from 1 to about 5 molecular layers of said second metal oxide on the surface of said first metal oxide core particles.

2. A composite metal oxide charge enhancing additive composition according to claim 1 further comprising an organosilane outer layer or coating covalently bonded on the outer surface of said second metal oxide layer to form composite particles of the formula $\{(M^1O_n)_x\}$-$\{(M^2O_n)_y\}$-$\{(Si\ R_{4-n})_z\}$, wherein said organosilane of the formula $\{(Si\ R_{4-n})_z\}$ represents the covalently bonded organosilane outer layer; n of said organosilane is an integer having a value of 1 to 3 and z is determined from the molar ratio of the orgnosilane component relative to said first and second metal oxides, R has from 1 to about 25 carbon atoms, and each R is independently selected from the group consisting of alkyl, alkenyl, alkynyl, aryl, alkaryl, aralkyl and halogenated derivatives thereof.

3. A charge enhancing additive composition according to claim 1 wherein the first metal oxide core particle is tin oxide, the second metal oxide is silicon dioxide and further comprising an organosilane outer surface coating derived from a fluorinated silane coupling agent.

4. A charge enhancing additive composition according to claim 1 wherein the first metal oxide core particle is tin oxide, the second metal oxide is silicon dioxide and further comprising an organosilane outer surface coating derived from 3,3,3-trifluoropropyl methyl dichlorosilane.

5. A composite metal oxide charge enhancing additive composition comprised Of a first metal oxide forming a core particle with an average particle size diameter from about 0.005 to about 0.05 microns, and a second metal oxide forming a uniform and continuous outer layer thereover with a thickness of about 1 to about 30 nanometers wherein said first and said second metal oxide are of the formula $\{(M^1O_n)_x\}$-$\{(M^2O_n)_y\}$ wherein $M^1$ represents said first metal oxide metal, $M^2$ represents said second metal oxide metal, n is an integer of 1 to 5 representing the number of oxygen atoms, x and y represent the relative molar ratios of said first and second metal oxides, $M^1$ is dissimilar to $M^2$, and wherein $M^1$ is tin, $M^2$ is titanium, n is 2, and the molar ratio of x to y is about 100:0.01 to about 100:10.

6. A toner additive metal oxide composite particle composition prepared by the process comprising:

(a) providing a first metal oxide core particle of the formula $(M^1O_n)_x$ with an average particle size diameter of about 0.005 to about 0.05 microns;

(b) contacting a reactive metal halide compound of the formula $(M^2X_n)$ as a gas or vapor with said metal oxide particles, $(M^1O_n)_x$, to form an intermediate product;

(c) exposing the intermediate product of step(b) to water vapor to form composite metal oxide particles of the formula $\{(M^1O_n)_x\}$-$\{(M^2O_n)_y\}$ wherein $(M^1O_n)_x$ represents said first metal oxide particles as core particles and $(M^2O_n)_y$ represents a metal oxide layer or coating on the surface of said first metal oxide core particles with a thickness of about 1 to 30 nanometers; and (d) optionally treating the surface of said composite metal oxide particles of the formula $\{(M^1O_n)_x\}$-$\{(M^2O_n)_y\}$, with a reactive organosilane of the formula $\{SiX_n R_{4-n}\}$, where X of the organosilane is a leaving group to form composite particles having a formula $\{(M^1O_n)_x\}$-$\{(M^2O_n)_y\}$- $\{(Si\ R_{4-n})_z\}$ wherein $M^1$ and $M^2$ are selected from the group consisting of Sn, Ti, Si, Al, and Ce, wherein $M^1$ and $M^2$ are dissimilar metals, n represents an integer of 1 to about 5 in said metal oxides, n represents an integer of 1 to 3 in said organosilane, x, y and z are determined from the relative molar ratios of said metal oxides and reactive organosilane, R has from 1 to about 25 carbon atoms and each R is independently selected from the group consisting of alkyl, alkenyl, alkynyl, aryl, alkaryl, aralkyl and halogenated derivatives thereof.

7. A composite metal oxide additive according to claim 6 wherein the relative ratio of x to y to z is selected to provide from 1 to about 5 molecular layers of said second metal oxide on the surface of said first metal oxide core particles and about one molecular layer of said organosilane outer layer on the surface of said second metal oxide.

8. A toner additive composition according to claim 6 wherein the first metal oxide core particle is tin oxide, and the second metal oxide is silicon dioxide.

* * * * *